(12) United States Patent
Lin et al.

(10) Patent No.: US 11,179,007 B2
(45) Date of Patent: Nov. 23, 2021

(54) VACUUM COMPARTMENT STRUCTURE FOR CUP LID AND MANUFACTURING METHOD THEREOF

(71) Applicant: Shenzhen Zhongmin Technology Co., Ltd., Guangdong (CN)

(72) Inventors: Yitong Lin, Guangdong (CN); Junwei Zhao, Guangdong (CN)

(73) Assignee: Shenzhen Zhongmin Technology Co., Ltd., Shenzhen (CN)

(*) Notice: Subject to any disclaimer, the term of this patent is extended or adjusted under 35 U.S.C. 154(b) by 138 days.

(21) Appl. No.: 16/583,580

(22) Filed: Sep. 26, 2019

(65) Prior Publication Data

US 2021/0053740 A1   Feb. 25, 2021

(30) Foreign Application Priority Data

Aug. 22, 2019  (CN) .......................... 201910777853.9

(51) Int. Cl.
| | |
|---|---|
| *A47J 41/00* | (2006.01) |
| *B23K 26/28* | (2014.01) |
| *B65D 43/02* | (2006.01) |
| *A47J 41/02* | (2006.01) |
| *B65D 81/20* | (2006.01) |

(52) U.S. Cl.
CPC ........... *A47J 41/0088* (2013.01); *A47J 41/00* (2013.01); *A47J 41/0055* (2013.01); *A47J 41/0077* (2013.01); *A47J 41/02* (2013.01); *A47J 41/022* (2013.01); *A47J 41/028* (2013.01); *B23K 26/28* (2013.01); *B65D 43/0204* (2013.01); *B65D 81/2015* (2013.01)

(58) Field of Classification Search
CPC .......... A47J 41/00; A47J 41/02; A47J 41/022; A47J 41/028; A47J 41/0055; A47J 41/0072; A47G 19/2288; A47G 19/2205; B65D 39/00; B65D 39/08
USPC ...... 220/573.1, 592.21, 592.22, 592.27, 215, 220/592.17, 288, 62.12, 62.18; 222/544–563
See application file for complete search history.

(56) References Cited

U.S. PATENT DOCUMENTS

| | | | | |
|---|---|---|---|---|
| 1,672,904 A | * | 6/1928 | Randall .............. | B65D 81/3818 220/592.27 |
| 2,981,430 A | * | 4/1961 | Chin ..................... | A47J 41/022 215/12.1 |
| 3,331,522 A | * | 7/1967 | Bridges ................. | A47J 41/028 215/12.1 |

(Continued)

*Primary Examiner* — J. Gregory Pickett
*Assistant Examiner* — Brijesh V. Patel

(57) ABSTRACT

Disclosed is a vacuum compartment structure for a cup lid and a manufacturing method thereof. The vacuum compartment structure for a cup lid includes a stainless steel cylinder body and a compartment upper cover. The compartment upper cover is covered on the cylinder body and has an inwardly recessed shape, and the compartment upper cover and the cylinder body are fixedly connected and sealed by laser welding. The compartment upper cover and the cylinder body form a vacuum chamber, which has a getter therein. The compartment upper cover is arranged with a plastic upper cover layer, an outer surface of the cylinder body is wrapped with a plastic lower cover layer, and the plastic upper cover layer is combined with the plastic lower cover layer to fasten and wrap the compartment upper cover and the cylinder body.

6 Claims, 1 Drawing Sheet

(56) References Cited

U.S. PATENT DOCUMENTS

| | | | | |
|---|---|---|---|---|
| 3,856,172 A * | 12/1974 | Walles | | A47J 41/022 215/364 |
| 4,184,601 A * | 1/1980 | Stewart | | A47J 41/02 215/13.1 |
| 4,842,909 A * | 6/1989 | Brassell | | B01J 20/20 210/205 |
| 4,856,174 A * | 8/1989 | Ishizaki | | A47J 41/028 29/455.1 |
| 5,904,264 A * | 5/1999 | Yamada | | B29C 66/72341 220/62.18 |
| 5,913,445 A * | 6/1999 | Fujii | | A47J 41/0077 220/574 |
| 6,119,889 A * | 9/2000 | Fujii | | A47J 41/0077 215/12.2 |
| 6,168,040 B1 * | 1/2001 | Sautner | | F16L 59/065 220/592.1 |
| 7,797,807 B2 * | 9/2010 | Ueda | | A47J 41/028 29/455.1 |
| 8,215,518 B2 * | 7/2012 | Hyde | | A47J 31/005 426/431 |
| 8,459,468 B2 * | 6/2013 | Lin | | B65D 41/26 220/592.16 |
| 10,034,579 B2 * | 7/2018 | Chaudhry | | A47J 41/024 |
| 10,351,331 B2 * | 7/2019 | Yu | | B65D 1/0207 |
| 2003/0146224 A1 * | 8/2003 | Fujii | | B65D 81/383 220/592.27 |
| 2005/0072816 A1 * | 4/2005 | von Spreckelsen | | B65B 7/2878 222/545 |
| 2009/0133688 A1 * | 5/2009 | La | | A47J 41/02 126/681 |
| 2013/0056474 A1 * | 3/2013 | Chaudhry | | B65D 81/3841 220/592.27 |
| 2015/0053679 A1 * | 2/2015 | Liu | | B65D 81/3881 220/215 |
| 2015/0072058 A1 * | 3/2015 | Johnson | | A47J 31/005 426/431 |
| 2015/0197390 A1 * | 7/2015 | Kurabe | | B65D 81/3841 220/592.27 |
| 2015/0232232 A1 * | 8/2015 | Shibuki | | B65D 41/26 220/592.16 |
| 2015/0313403 A1 * | 11/2015 | Park | | A47J 36/00 220/573.1 |
| 2016/0068294 A1 * | 3/2016 | Gorbold | | C03C 8/24 215/12.1 |
| 2016/0214783 A1 * | 7/2016 | Xie | | B65D 81/3841 |
| 2017/0119212 A1 * | 5/2017 | Petrillo | | A47J 41/024 |
| 2017/0137176 A1 * | 5/2017 | Gorbold | | B65D 39/08 |
| 2019/0216264 A1 * | 7/2019 | Adams, Jr. | | A47J 41/022 |

\* cited by examiner

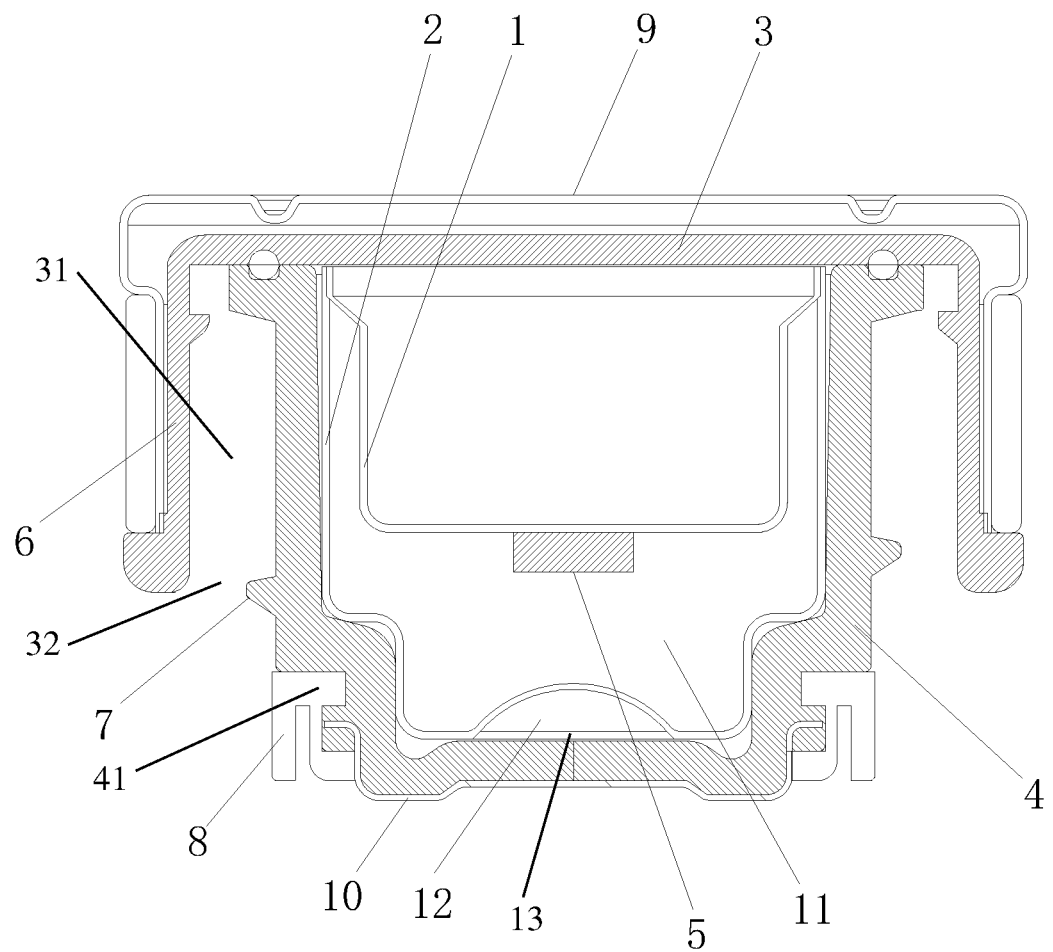

VACUUM COMPARTMENT STRUCTURE FOR CUP LID AND MANUFACTURING METHOD THEREOF

CROSS REFERENCE TO RELATED APPLICATIONS

The present application claims priority of Chinese Patent Application No. 201910777853.9 filed on Aug. 22, 2019. The contents of the application are incorporated herein by reference in their entireties.

TECHNICAL FIELD

The application relates to a compartment structure for a cup lid and a manufacturing method thereof, in particular to a vacuum compartment structure for a cup lid and a manufacturing method thereof.

BACKGROUND

At present, the insulation structure for a cup lid of many heat-insulated cups insulates heat by filling the cup lid with insulation material. The structure has certain thermal insulation effect, but the effect is poor; while some use a vacuum structure to insulate heat, however, a complete vacuum in the cup lid compartment is difficult to achieve by vacuum technologies used in this field. At present, it takes a very high cost to achieve a complete vacuum, which is not practical from an economic point of view. Moreover, the existing vacuum compartment structures are a single-layer structure, and the defect is that it is impossible to test whether the cup lid is in a vacuum state. Therefore, it is necessary to improve the heat insulation structure of existing cup lids.

SUMMARY OF THE APPLICATION

The technical problem to be solved by the present application is to provide a vacuum compartment structure for a cup lid and a manufacturing method thereof, aiming at further improving the heat insulation effect.

In order to solve the above technical problem, the technical proposal adopted by the present application is: a vacuum compartment structure for a cup lid includes a stainless steel cylinder body and a compartment upper cover. The compartment upper cover is covered on the cylinder body and has a concave shape. The compartment upper cover and the cylinder body are fixedly connected and sealed by laser welding; the compartment upper cover and the cylinder body form a vacuum chamber which has a getter therein. The compartment upper cover is provided thereon with a plastic upper cover layer, an outer surface of the cylinder body is wrapped with a plastic lower cover layer, and the plastic upper cover layer is combined with the plastic lower cover layer to fasten and wrap the upper cover and the cylinder body.

Further, the plastic upper cover layer and the plastic lower cover layer are integrally formed, to fasten and wrap the compartment upper cover and the cylinder body.

Further, a stainless steel outer cover layer is arranged on the plastic upper cover layer, and the plastic upper cover layer is adhered and fixed to the stainless steel outer cover layer.

Further, the plastic upper cover layer extends vertically downward along the plastic lower cover layer and forms an extending portion. The extending portion forms a cup mouth groove with the plastic lower cover layer. The plastic lower cover layer extends laterally outward and forms a protruding portion. A snap-fit opening is formed between the protruding portion and the extending portion.

Further, a recessed groove is provided at one end of the plastic lower cover layer which is away from the plastic upper cover layer, and the recessed groove is sleeved with a silicone ring therein.

Further, the getter is fixed to the compartment upper cover.

Further, a bottom of the cylinder body is provided with a recess-shaped air suction hole, and the air suction hole is covered by a soldering flux to seal the vacuum chamber.

Further, the air suction hole has a width of 0.5 mm and a recessing depth of 5 mm.

A method of manufacturing a vacuum compartment structure for a cup lid, includes the following steps, S1: fixing the getter to the compartment upper cover;

S2: welding the compartment upper cover and the cylinder body by laser welding after the compartment upper cover is covered on and in interference fit with the cylinder body;

S3: drawing air out of the cylinder body through the air suction hole opened on the cylinder body, and then covering the air suction hole by a soldering flux to form a semi-vacuum chamber;

S4: placing the cylinder body in a high-temperature furnace to heat at a high temperature, and activating the getter in the semi-vacuum chamber to oxidize and absorb the air in the semi-vacuum chamber in order to form a full-vacuum chamber;

S5: laying a layer of plastic upper cover layer on the compartment upper cover, and wrapping a plastic lower cover layer around the outer surface of the cylinder body, and then integrally forming the plastic upper cover layer and the plastic lower cover layer to cover the compartment upper cover and the cylinder body completely. The plastic upper cover layer extends vertically downward along the plastic lower cover layer and forms an extending portion. The extending portion forms a cup mouth groove with the plastic lower cover layer. The plastic lower cover layer extends laterally outward and forms a protruding portion. A snap-fit opening is formed between the protruding portion and the extending portion.

Further, the method of manufacturing the vacuum compartment structure for a cup lid further includes the following steps, S6: a stainless steel outer cover layer is disposed on the plastic upper cover layer, and the plastic upper cover layer is adhered and fixed to the stainless steel outer cover layer.

The above technical proposal of the present application has the following advantages over the prior art:

(1) The vacuum compartment structure for a cup lid of the present application includes a stainless steel cylinder body and a compartment upper cover; the compartment upper cover has an inwardly recessed shape, and the compartment upper cover is covered on the cylinder body. The compartment upper cover is connected and sealed with the cylinder body by laser welding; the compartment upper cover forms a vacuum chamber with the cylinder body, and a getter is provided in the vacuum chamber, so that the air in the chamber formed by the compartment upper cover and the cylinder body can be oxidized to reach a full vacuum state, hence a better heat insulation effect can be achieved. The compartment upper cover has an inwardly recessed shape, and is configured to be capable for a temperature measuring device to detect whether the chamber formed by the compartment upper cover and the cylinder body reaches a vacuum state. The plastic upper cover layer is combined with the plastic lower cover layer to fasten and wrap the compartment upper cover and the cylinder body; the compartment upper cover and the cylinder body are fastened and wrapped by the plastic upper cover layer and the plastic lower cover layer, so that the vacuum chamber is wrapped, hence the heat is less likely to be lost, and the heat insulating effect is better, and the heat preservation time can be extended.

(2) The method of manufacturing the vacuum compartment structure for a cup lid according to the present application, after the getter is fixed on the compartment upper cover, the inwardly recessed compartment upper cover is welded to the cylinder body by laser welding. Then, the air in the cylinder body is drawn through the air suction hole opened on the cylinder body, and the air suction hole is covered by the soldering flux to form a semi-vacuum chamber. The cylinder body is placed and heated in a high-temperature furnace, and the getter in the semi-vacuum chamber is activated to oxidize and absorb the air in the semi-vacuum chamber to form a full vacuum chamber. The vacuum compartment structure produced by the method has simple processing steps, low production cost, and can remove the air in the cylinder body to the maximum extent, so that the heat insulating effect is better and the heat preservation time can be extended.

BRIEF DESCRIPTION OF THE DRAWING

The specific structure of the present application will be described in detail below with reference to the drawing.

FIG. 1 is a schematic view showing the vacuum compartment structure of a cup lid according to an embodiment of the present application.

1 compartment upper cover, 2 cylinder body, 3 plastic upper cover layer, 4 plastic lower cover layer, 5 getter, 6 extending portion, 7 protruding portion, 8 silicone ring, 9 stainless steel outer cover layer, 10 stainless steel inner cover layer, 11 vacuum chamber, 12 air suction hole.

DESCRIPTION OF THE EMBODIMENTS

As shown in FIG. 1, an embodiment of the present application is: a vacuum compartment structure for a cup lid includes a stainless steel cylinder body 2 and a compartment upper cover 1. The compartment upper cover 1 is covered on the cylinder body 2. The compartment upper cover 1 has an inwardly recessed shape, and the compartment upper cover 1 and the cylinder body 2 are fixedly connected and sealed by laser welding. The compartment upper cover 1 and the cylinder body 2 form a vacuum chamber 11, which has a getter 5 therein. The compartment upper cover 1 is arranged with a plastic upper cover layer 3, an outer surface of the cylinder body 2 is wrapped with a plastic lower cover layer 4, and the plastic upper cover layer 3 is combined with the plastic lower cover layer 4 to fasten and wrap the upper cover and the cylinder body 2.

The vacuum compartment structure for a cup lid can make the heat less likely to be lost, and the cup lid with the vacuum compartment structure has better heat insulating effect and can extend the heat preservation time; at the same time, the compartment upper cover 1 has an inwardly recessed shape, which facilitates the detection of the temperature at the bottom of the cylinder body 2 by adding hot water to the upper cover 1 to confirm whether or not the chamber formed by the upper cover 1 and the cylinder body 2 is in a vacuum state.

Specifically, the plastic upper cover layer 3 is integrally formed with the plastic lower cover layer 4, and the compartment upper cover 1 and the cylinder body 2 are fastened and wrapped. The plastic upper cover layer 3 and the plastic lower cover layer 4 may be integrally formed by injection molding, or may be interference-fitted and then fastened by screws, to fasten and wrap the compartment upper cover 1 and the cylinder body 2.

Further, the plastic upper cover layer 3 is further provided with a stainless steel outer cover layer 9, and the plastic upper cover layer 3 is adhered and fixed to the stainless steel outer cover layer 9. The stainless steel outer cover layer 9 and the plastic upper cover layer 3 may be fixed by snap-fitting. The stainless steel outer cover layer 9 provides protection to the plastic upper cover layer 3 and is more impact resistant.

Preferably, a stainless steel inner cover layer 10 may be arranged at the bottom of the plastic lower cover layer 4. The stainless steel inner cover layer 10 is fixed with the plastic lower cover layer 4 by snap-fitting. In use, the stainless steel inner cover layer 10 can separate the plastic lower cover layer 4 and the cup to prevent the lower cover layer 4 from being in direct contact with the inside of the cup, providing a better user experience.

Further, the plastic upper cover layer 3 extends vertically downward along the plastic lower cover layer 4 to form an extending portion 6, and the extending portion 6 forms a cup mouth groove 31 with the plastic lower cover layer 4. The plastic lower cover layer 4 extends laterally outward to form a protruding portion 7. A snap-fit opening 32 is formed between the protruding portion 7 and the extending portion 6. The cup mouth groove 31 cooperates with the mouth of a cup during use, and fixation can be achieved by the snap-fit opening 32 and a body of the cup.

Further, an annular recessed groove 41 is provided at an end of the plastic lower cover layer 4 away from the plastic upper cover layer 3, and the recessed groove 41 is sleeved with a silicone ring 8. When in use, the silicone ring 8 enables the cup lid to fit tightly with the mouth to prevent heat loss and enhance the heat insulating effect, at the same time to prevent the water inside the cup from leaking.

Specifically, the getter 5 is fixed to the compartment upper cover 1. The getter 5 used is chromium, by placing the chromium into a metal mesh case and welding the metal mesh case to the compartment upper cover 1.

Further, a recess-shaped air suction hole 12 is opened on a bottom of the cylinder body 2, and the air suction hole 12 is covered by a soldering flux 13 to seal the vacuum chamber 11. The air in the cylinder body 2 is drawn through the air suction hole 12, and then the air suction hole 12 is plugged with the soldering flux 13.

Further, the air suction hole 12 has a width of 0.5 mm and a recessing depth of 5 mm.

Another embodiment of the present application is a method of manufacturing a vacuum compartment structure for a cup lid, including the following steps:

S1: fixing the getter to the compartment upper cover. The getter 5 used is chromium, by placing the chromium into a metal mesh case and welding the metal mesh case to the compartment upper cover 1.

S2: welding the compartment upper cover and the cylinder body by laser welding after the compartment upper cover is covered on and in interference fit with the cylinder body;

S3: drawing air out of the cylinder body through the air suction hole opened on the cylinder body, and then covering the air suction hole by a soldering flux to form a semi-vacuum chamber;

S4: placing the cylinder body in a high-temperature furnace to heat at a high temperature, and activating the getter in the semi-vacuum chamber to oxidize and absorb the air in the semi-vacuum chamber in order to form a full-vacuum chamber;

S5: laying a layer of plastic upper cover layer on the compartment upper cover, and wrapping a plastic lower cover layer around the outer surface of the cylinder body, and then integrally forming the plastic upper cover layer and the plastic lower cover layer to cover the compartment upper cover and the cylinder body completely. The plastic upper cover layer extends vertically downward along the plastic lower cover layer and forms an extending portion. The extending portion forms a cup mouth groove with the plastic lower cover layer. The plastic lower cover layer extends laterally outward and forms a protruding portion. A snap-fit opening is formed between the protruding portion and the extending portion. The extending portion extending from the plastic upper cover layer and the protruding portion extending laterally from the plastic lower cover layer may be formed by injection molding.

Further, the method of manufacturing the vacuum compartment structure for a cup lid further includes the following steps, S6: a stainless steel outer cover layer is disposed on the plastic upper cover layer, and the plastic upper cover layer is adhered and fixed to the stainless steel outer cover layer. The plastic upper cover layer and the stainless steel outer cover layer can be fixed by snap-fitting.

The vacuum compartment structure produced by the method embodiment, after the chromium is heated and oxidized, the vacuum state in the chamber formed by the compartment upper cover and the cylinder body is detected by measuring temperature from the inwardly recessed compartment upper cover using a temperature measuring device. The quality of the product can be effectively guaranteed. At the same time, the above-mentioned process steps for manufacturing the vacuum compartment structure are simple, thus the manufacturing cost is low, and the air in the cylinder body can be removed to the utmost, so that the heat insulating effect is better and the heat preservation time can be extended.

Herein, the "first" and "second", etc. only represent the distinction between their names, and do not mean that their importance and position are different.

Herein, "up", "down", "left, right", "front", and "back" only represent their relative positions and do not indicate their absolute position.

Above are only embodiments of the present application, and are not intended to limit the scope of the present application. Equivalent structures or equivalent process, or applications directly or indirectly to other related art utilizing the present specification and drawings are all included in the scope of patent protection of the present application.

What is claimed is:

1. A vacuum compartment structure for a cup lid, comprising
    a stainless steel cylinder body; and
    a compartment upper cover covered on the stainless steel cylinder body and having a concave shape,
    wherein the compartment upper cover and the stainless steel cylinder body are fixedly connected and sealed by laser welding, a vacuum chamber is formed by the compartment upper cover and the stainless steel cylinder body, the vacuum chamber having a getter therein, and
    wherein the compartment upper cover is provided thereon with a plastic upper cover layer, an outer surface of the stainless steel cylinder body is wrapped with a plastic lower cover layer, the plastic upper cover layer is combined with the plastic lower cover layer to fasten and wrap the compartment upper cover and the stainless steel cylinder body;
    wherein the plastic upper cover layer and the plastic lower cover layer are integrally formed to fasten and wrap the compartment upper cover and the stainless steel cylinder body; and
    a stainless steel outer cover layer is further arranged on the plastic upper cover layer, the plastic upper cover layer is adhered and fixed to the stainless steel outer cover layer.

2. The vacuum compartment structure for a cup lid according to claim 1, wherein the plastic upper cover layer extends vertically downward along the plastic lower cover layer and forms an extending portion, the extending portion forms a cup mouth groove with the plastic lower cover layer, the plastic lower cover layer extends laterally outward and forms a protruding portion, a snap-fit opening is formed between the protruding portion and the extending portion.

3. The vacuum compartment structure for a cup lid according to claim 2, wherein a recessed groove is provided at one end of the plastic lower cover layer away from the plastic upper cover layer, and the recessed groove is sleeved with a silicone ring therein.

4. The vacuum compartment structure for a cup lid according to claim 1, wherein the getter is fixed to the compartment upper cover.

5. The vacuum compartment structure for a cup lid according to claim 1, wherein a recess-shaped air suction hole is opened on a bottom of the stainless steel cylinder body, and the recess-shaped air suction hole is covered by a soldering flux to seal the vacuum chamber.

6. The vacuum compartment structure for a cup lid according to claim 5, wherein the recess-shaped air suction hole has a width of 0.5 mm and a recessing depth of 5 mm.

* * * * *